April 19, 1955
E. BOBKOWICZ
2,706,312
BAST FIBER UTILIZATION
Filed March 3, 1952
7 Sheets-Sheet 2
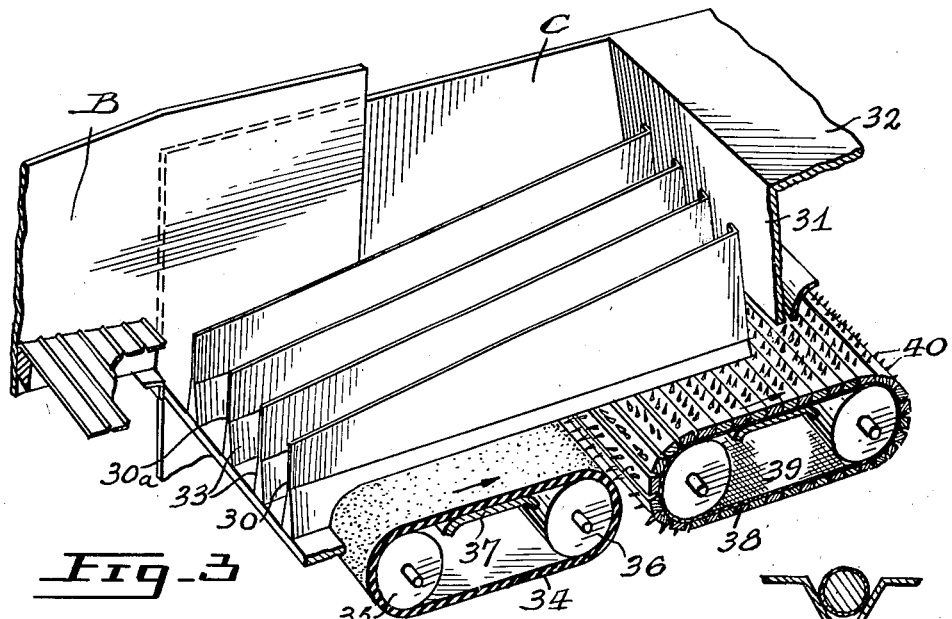
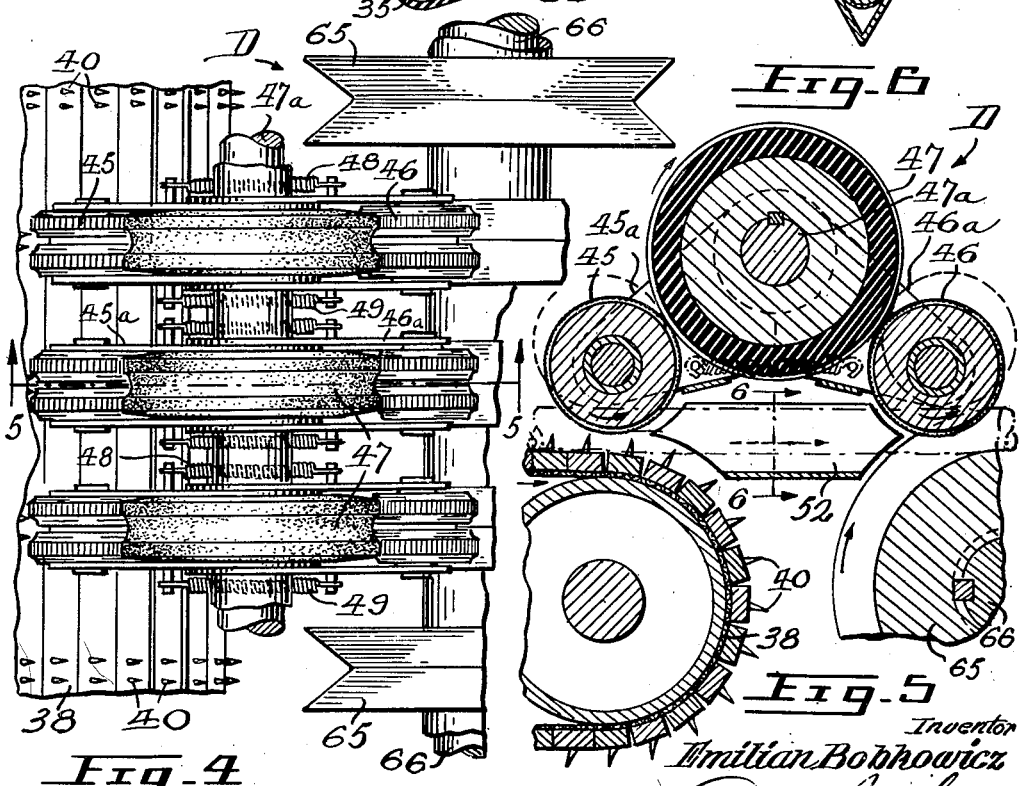
Inventor
Emilian Bobkowicz
By Alan Swabey
Attorney April 19, 1955   E. BOBKOWICZ   2,706,312
BAST FIBER UTILIZATION
Filed March 3, 1952   7 Sheets-Sheet 3
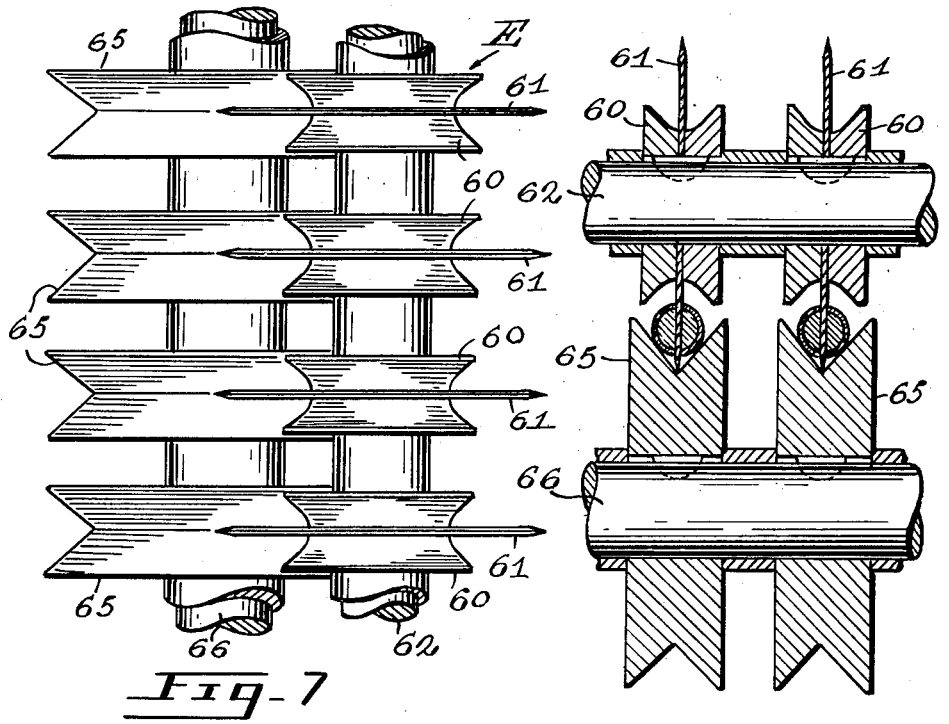
Fig-7
Fig-8
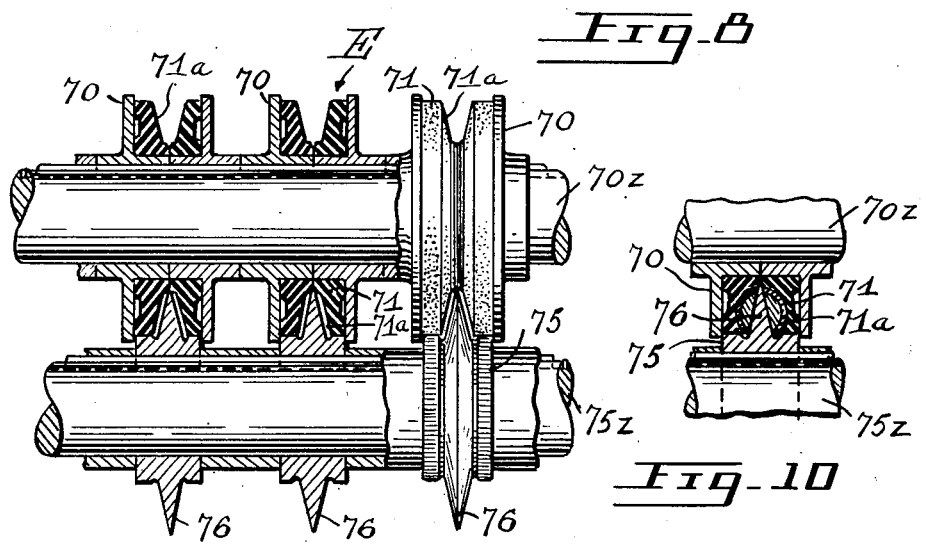
Fig-9
Fig-10
Inventor
Emilian Bobkowicz
By Alan Swabey
Attorney

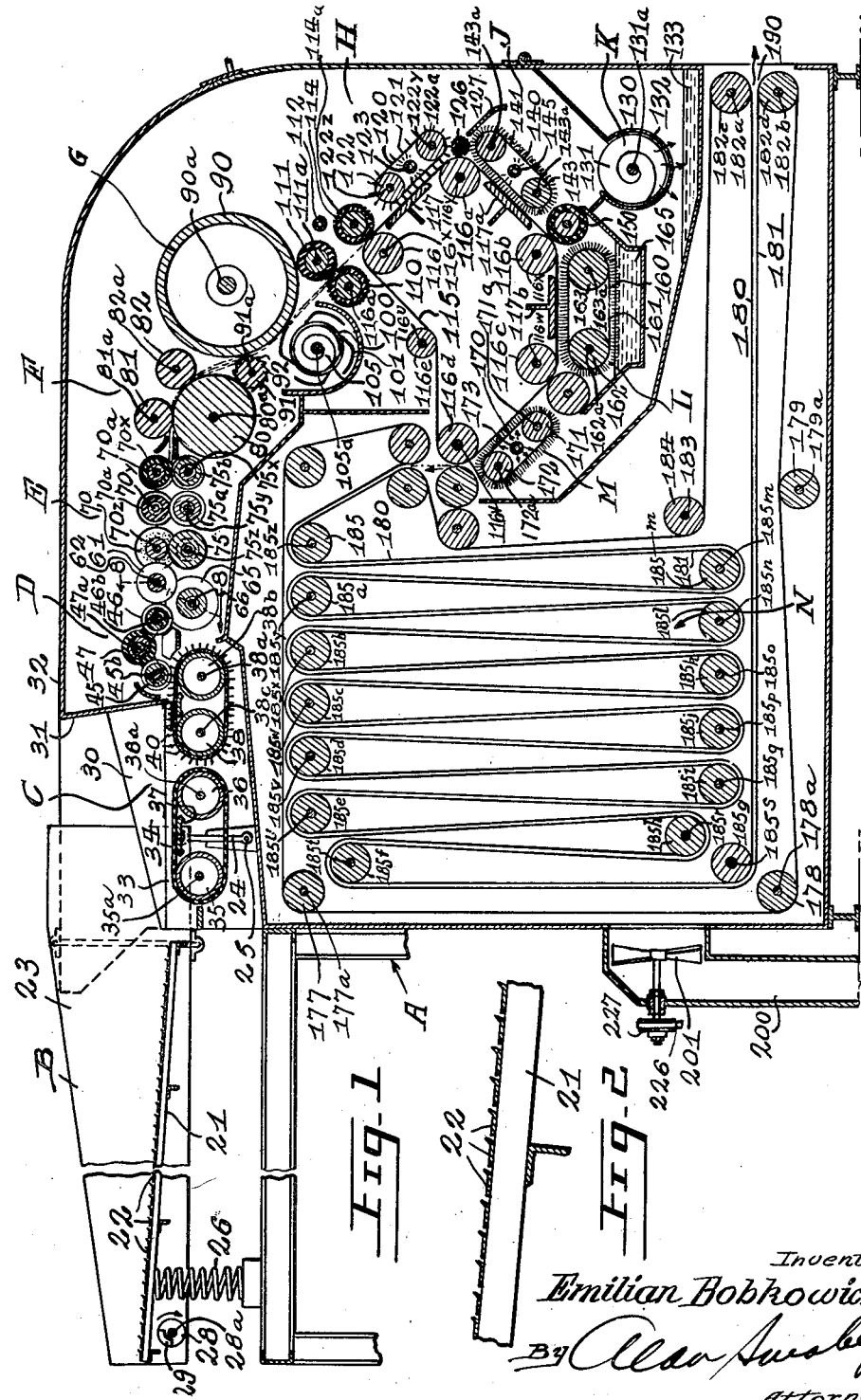

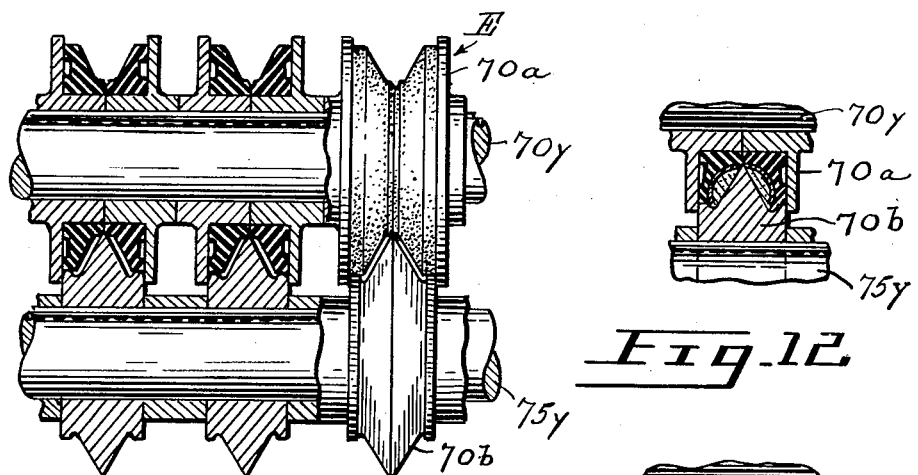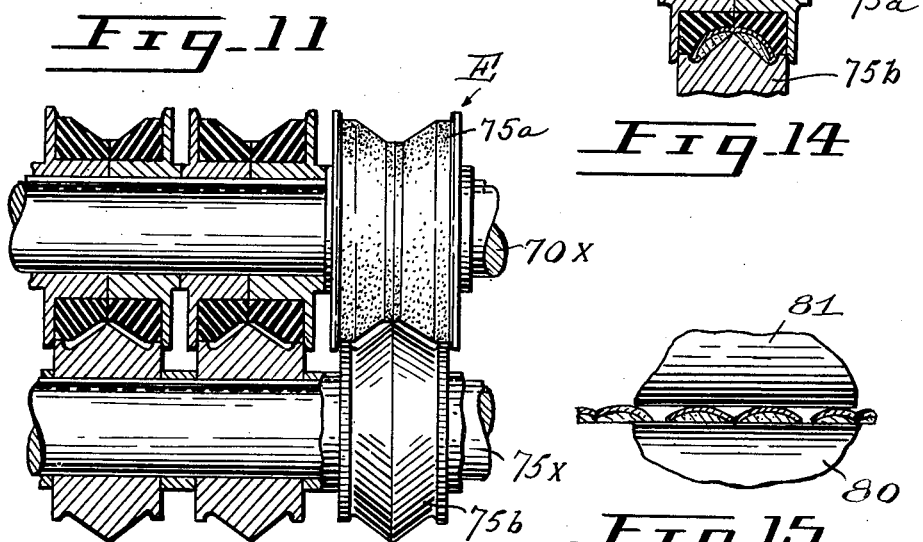

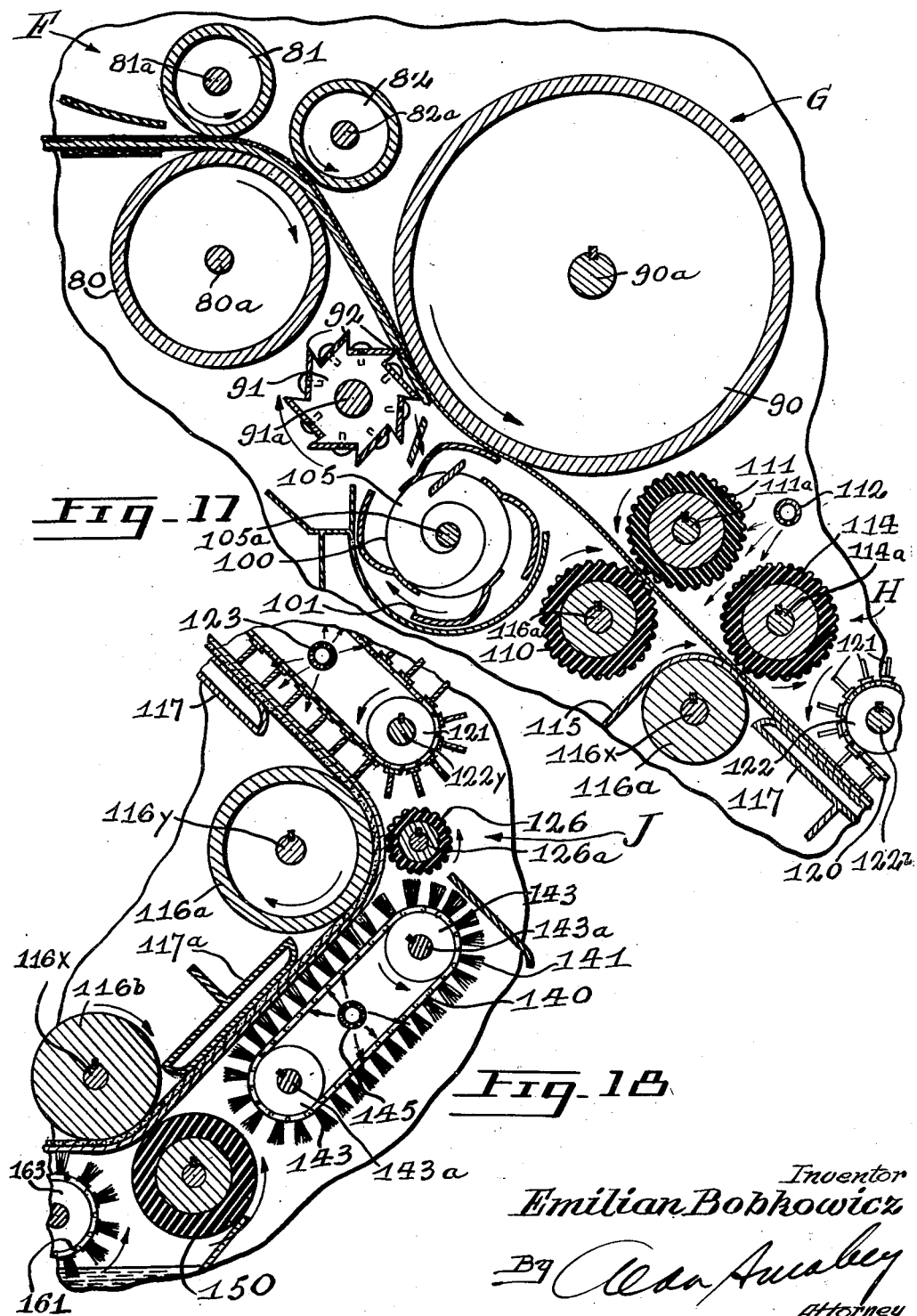

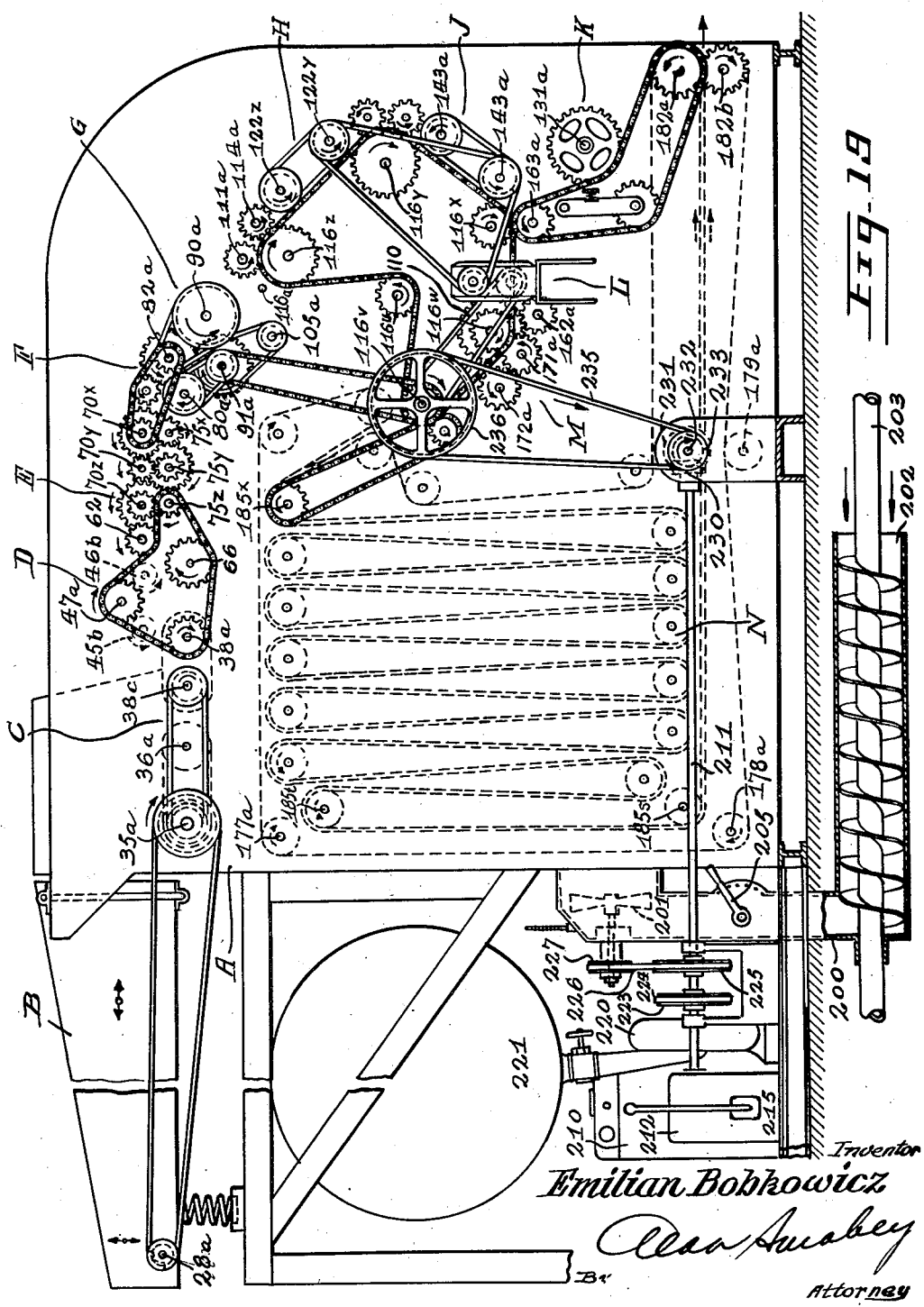

United States Patent Office 2,706,312
Patented Apr. 19, 1955

2,706,312

BAST FIBER UTILIZATION

Emilian Bobkowicz, Westmount, Quebec, Canada

Application March 3, 1952, Serial No. 274,570

6 Claims. (Cl. 19—7)

This invention relates to a process for extracting useful components of bast fiber plants and converting these components into commercial commodities.

Plants to which the present invention may be applied are the so-called soft fiber plants of a type having a stalk in which the fiber is located between an outside bark and a center wood portion.

Representative examples of the plants to which the invention is applicable are *Corchorus capsularis* from which jute is obtained, *Hibiscus cannabinus* from which kenaf is obtained, and ramie.

The usual commercial process of extracting fiber from the soft fiber plants of this nature includes retting the harvested stalks of the plants which are still green and then separating the bark from the woody portion and separating the bast layer from the remainder of the bark.

The prior art also contains numerous examples of mechanical methods which have been proposed for decorticating bast fiber plants. These methods suffer from one shortcoming or another and their use has not become general.

The applicant aims to avoid the disadvantages of the prior art processes and to achieve certain positive advantages which will be evident from the specification to follow.

Applicant's development

Briefly summarized, the applicant's overall process is embodied in the following procedure. Starting from a mass of stalks assembled in parallel relationship, the mass is subdivided into groups and continuously and simultaneously stalks are selected from the groups and each selected stalk is treated as follows. First it is split in half. Then, the split halves are laid side by side, preferably the bark facing in the same direction. Then, each half is worked as follows. The half is flexed to loosen the bark. The wood is cut transversely at spaced-apart intervals. The resulting short lengths of wood are picked off and conveyed away. The resulting bark is then brushed in the presence of water, and dried. There is recovered from each half stalk in the form of a flat sliver or fleece, the fiber.

The invention may be used in an integrated process of utilization of the components of the fiber which may be briefly summarized as follows. The fiber is recovered and passed to a textile operation, for example spinning or making into non-woven fabric. The woody parts are recovered and comminuted. The pectins and gums are recovered and mixed with the comminuted woody parts and waste fibers. The mixture thus formed is pressed into board used for building or other purposes. A binder, for example a resin, may be added to the mixture.

Tthe invention also contemplates apparatus for carrying out these processes. The apparatus features of the invention are embodied in an apparatus which may be briefly summarized as follows. A vibrating hopper is arranged for receiving the mass of stalks. A plurality of side-by-side open-bottom bins are arranged selectively to receive groups of the stalks from the mass from the hopper and to align and select stalks for treatment. Conveying means operating through the open bottoms of the bins is arranged to engage each individual stalk, a number at a time, and to feed the stalks to a cutting apparatus. Each stalk is passed into a channel preferably of V-shape to handle different diameter stalks, into which and out of which it is conveyed by a roller feed unit. A circular knife unit acting in a cooperating channel roller cuts the stalks in half. A plurality of wedging units including circular wedges cooperating with accompanying channeled rollers gradually separates the halves and by degrees lays them flat with the bark on top and wood on the bottom. An assembly having an extensive retaining surface receives the flexed stalks. A rotary cutting unit having spaced-apart blades cuts the wood of the half transversely and breaks the wood into small bits while against the retaining surface. The bits are picked from the bark by a scutcher which includes a centrally-arranged conveyor and a plurality of fingers for picking the wood from the bark. A scraping and brushing arrangement scrapes the gums and pectin layer and foreign matter from the bark. The fiber is passed out in the form of a flat sliver or fleece.

A suitable driving mechanism is provided to drive the parts of the various units in synchrony. The arrangement of the apparatus is such that the various parts including the driving mechanism can be compactly arranged and if desired conveniently carried on a vehicle, for example a truck, and the drive taken from the engine of the vehicle.

It will be understood that preferably each of a number of stalks are simultaneously treated at the same time by a number of parallel elements of the various units described and when the stalk is divided into halves, a number of halves are treated simultaneously. The stalks are advanced continuously from the time they come under treatment until discharged as fiber.

The invention resides in combinations of process steps and in novel individual steps as will be appreciated in comparing the process with the prior art. Apparatus-wise, the invention resides in novel combinations of apparatus features as described, as well as in novel apparatus sub-combinations and units, all as will appear from reading the description and comparing the apparatus with the prior art.

The invention will be understood more completely by reference to the detailed description which follows and which is illustrated by reference to a preferred process and apparatus which embodies it, in the accompanying drawings, in which:

Figure 1 is a vertical cross section viewing in general a preferred apparatus for the separation and recovery of the various components of the plant.

Figure 2 is a detailed view of the vibrating stalk-receiving hopper.

Figure 3 is a perspective view showing the aligning and stalk selecting unit.

Figure 4 is a top plan view of the stalk positioning and feeding part of the cutting unit.

Figure 5 is a vertical cross section along the line 5—5 of Figure 4.

Figure 6 is a cross section along the line 6—6 of Figure 5.

Figure 7 is a top plan view of the cutting part of the cutting unit.

Figure 8 is a cross section along the line 8—8 of Figure 1.

Figure 9 is a vertical cross section through the first wedging unit.

Figure 10 is a more detailed view showing the application of the first wedging unit to the stalk.

Figure 11 is a transverse vertical cross section through the second wedging unit.

Figure 12 is a more detailed view showing the application of the second wedging unit to the stalk.

Figure 13 is a transverse vertical cross section through the third wedging unit.

Figure 14 is a more detailed view showing the application of the third wedging unit to the stalk.

Figure 15 is a front elevation of the flexing unit showing the position of the stalk halves.

Figure 16 is a transverse vertical cross section showing the fiber halves disposed between the drying conveyor belts.

Figure 17 is a vertical longitudinal cross section through the flexing and wood-separating units.

Figure 18 is a fragmentary vertical cross section through the scraping and first brushing unit.

Figure 19 is a side elevation from one side of the apparatus showing a suitable drive mechanism.

Figure 20:
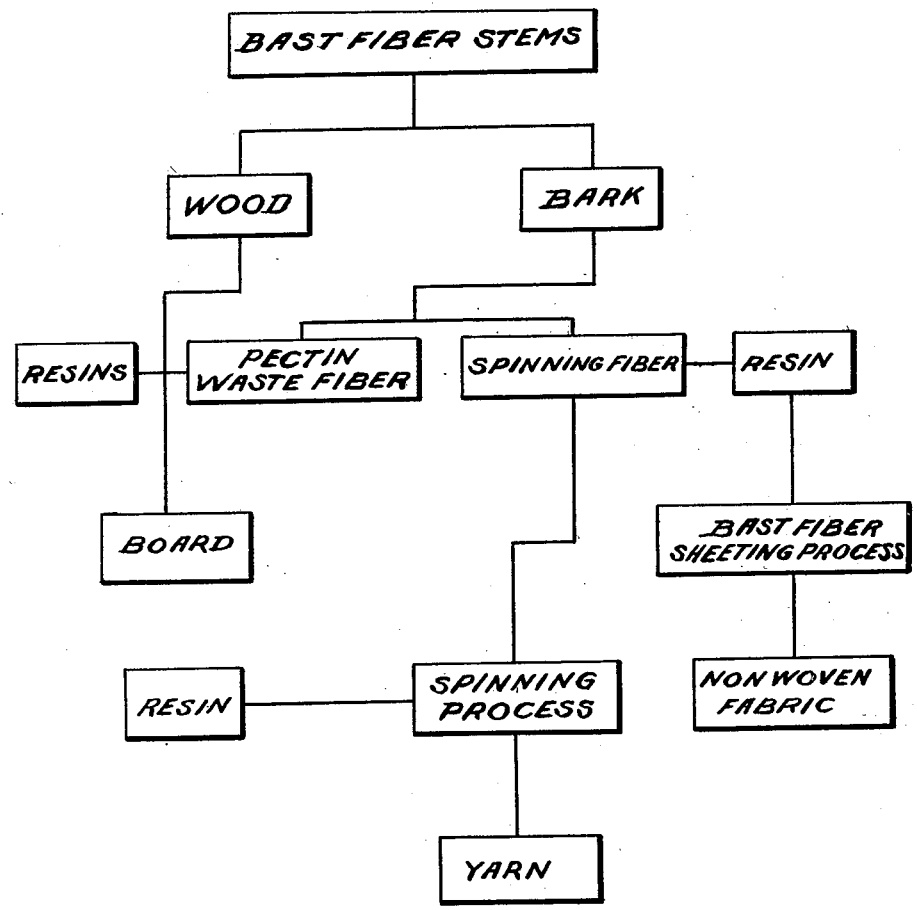
Figure 20 is a flow sheet illustrating an integrated process of utilizing the various components of a bast fiber plant as made possible by the present invention.

The method and apparatus of the invention will best be understood in detail by considering the way in which the plant is treated during its passage through the apparatus as shown, in the drawings.

Units B and C

The frame of the apparatus is represented generally by A. First, a number of stalks are thrown lengthwise into vibrating feeder B. The action of the unit B is to push the stems forward to a divider unit C.

The unit B includes a vibrating platform 21 and side walls 23. This platform 21 has transverse riffles 22. The forward end of each wall 23 is mounted on an arm 24 pivoted as at 25 to the frame A of the apparatus. The vibration is achieved by supporting the rear end of the platform 21 on coil springs 26 supported by the frame A and by providing an eccentric flywheel 28 on a shaft 28a toward the rear of the unit B. This flywheel is pivoted between the walls 23 and is provided with an eccentrically positioned weight 29.

Unit C

The stalks are vibrated into the receiving and separating apparatus C as follows. They fall into stalls or compartments formed by parallel walls 30, 30a, etc. suitably held to a front wall 31 which forms a part of the outside body or hood 32 covering the other parts of the apparatus to be described. The bottoms of the walls of each stall taper inwards as at 33 to form a narrowing chute for receiving one stalk only. A conveyor belt 34, for example of rubber, feeds the stalks forward. This belt is mounted on rollers 35 and 36 (on shafts 35a and 36a respectively) driven from a suitable source of power and the midportion of the top run of the belt is supported by a plate 37. The stalks are then subjected to the action of a conveyor belt 38 made up of a plurality of slats of wood 38a, or other suitable material, held on a flexible backing 39, for example of textile fabric. Each slat 38a is provided with spaced-apart metal spikes appropriately spaced for engaging the stalk in the respective bin above it. The belt 38 runs on rollers 38a and 38b on shafts 38c and 38d respectively.

The action of the belt 38 is to engage the stalk with its spikes 40 and to force it forward for the next operation, on a unit D for cutting the stems in two.

Unit D

The unit D includes a feeding part made up of feed rollers 45 and 46, mounted on shafts 45b and 46b respectively, transverse to the direction of feed and a driving roller 47 mounted on a shaft 47a also transverse to that of the direction of feed. The rollers 45, 46 and 47 are covered with a resilient material, e. g. rubber. Each is mounted on its own bracket 45a and 46a pivoted on the axle 47a of the roller 47.

The coil tension spring 48 is connected between the brackets 45a and 46a so as to draw these brackets together and consequently to press the rollers 45 and 46 against the surface of material being fed.

A guiding channel member 52 guides each stalk between a groove in the rollers 45 and 46.

The cutting unit D includes a channeled roller 60 provided with a rotary knife 61 in the middle of the channel, the roller 60 being mounted on a transverse shaft 62. Cooperating with each roller 60 is a roller 65 having a channel, preferably V-shaped, in its surface. The rollers 65 are mounted on a transverse shaft 66.

Each stalk is fed, as shown, between the channels of the rollers 60 and 65 and is progressively cut in two by the knife 61.

Unit E

The stalk is then passed to a flattening unit E, made up of a series of mating rollers 70 (on shafts 70z) having concave tread 71 of rubber and thus provided with a channel 71a. Each roller 70 mates with a roller 75 which is provided with an annular metal wedge 76. Succeeding sets of mating rollers 70a, 75a, 70b, 75b, etc. of progressively increasing bluntness (on respective shafts 70y, 75y, 70x, 75x, etc.) are provided to flatten the split stalk by degrees until eventually it reaches the condition shown in Figure 15 in which split parts are arranged to have the bark upwards and the wood downwards.

Unit F

In this condition the stalk is fed to a flattening and pressing unit F.

The unit F is made up of a large cylindrical roller 80 cooperating with two similar rollers 81 and 82 (on respective shafts 81a, 82a). The purpose of these rollers is to flatten the split stalk and to flex it about the circumference of the roller 80 on shaft 80a.

Unit G

In the next operation flattened and flexed stalks are fed to a cutting and stripping unit G. This is made up of a cylindrical drum 90 on shaft 90a and a cutting wheel or roller 91 (on shaft 91a) provided with elongated axially extending chisel edges 92. It is seen that each chisel edge is made up of a plate which is held to the body by screws. The edges of the plates can be removed for sharpening.

The unit is so arranged that the plates 92 go through the wood transversely dividing it into chips, the edge of the blades being spaced from the peripheral surface of the roll 90 so as not to penetrate to the bark which is laying on that surface.

The unit G also includes a stripper for picking off the wood chips. This is made up of a centrally-arranged screw conveyor 105 on shaft 105a which carries it out laterally from the housing and fingers 101 extending from its surface as shown. The function of these fingers is to pick off the previously cut and separated wood from the bark and to feed it to the conveyor.

Unit H

Thus the wood has been stripped from the bark and the bark is fed between the next pairs of rollers of the scrubbing unit H. This is made up of the pair of feed rollers 110 and 111 (shafts 110a and 111a), provided with corrugated surfaces of rubber or other material. The function of these rollers is merely to grip the bark between them for sure feeding. The bark is now fed onto an endless conveyor belt 115 of metal or suitable material which runs about rollers 116, 116a, etc. (shafts 116z, 116y, etc.). Intermediate the sets of rollers the belt is provided with adjustable supporting platforms 117, 117a, 117b, etc. 114 is a feed roller, which cooperates with the roller 116 to engage the bark and feed it onto the belt 115.

In the arrangement described, the wood is shown downwards and the bark upwards. This, of course, can be varied so that the wood is outwards. The main thing is that the wood must be outwards in respect of the surface on which the split stalk is laid when the wood is cut transversely, so that the wood will be cut without cutting the bark.

While on this belt, the bark is subjected to a scrubbing and washing operation.

First it is scrubbed by a conveyor belt 120 provided with scraping knives or needles 121. The belt 120 is mounted on rollers 122 and 122a (shafts 122z, 122y). Water sprays 123 and 124 spray water on the bark to clean the knives and to wash out the impurities which flow over the roller 126 and the guard plate 127 into the trough 130 which is provided with a screw conveyor 131 to carry the material away out of the machine. The trough 130 is provided at 132 with means to allow the liquor to escape into a waste basin 133.

Next, the bark is subjected to the action of a belt 140 surfaced with bristles of nylon or other material 141. The belt runs on the rollers 143 (shafts 143a). A water spray 145 is sprayed on the brushes cleaning the brushes and washing the fiber. The bark is then carried on the belt between the roller 116b (shaft 116z) and a cooperating press roller 150 (shaft 150a), these rollers being urged together to hold the fiber tight.

Next, the bark is subjected to the action of nylon bristles 160 mounted on the surface of a belt 161 running on rollers 162 and 163 (shafts 162a, 163a). This brush runs through a solution of chemical in the heated bath 165. This applies the chemical to the fiber for the purpose of cleaning and softening it.

The fiber then comes into contact with another rotary brush 170 mounted on rollers 171 and 172 (shafts 171a, 172a). The purpose of this brush is to scrub out the chemicals. This is fed by a spray 173.

Thence the fiber goes to the drying apparatus N which is made up of parallel belts 180 and 181 made of perforated steel or other suitable material. These belts retain the fiber between them as they pass about the rollers 185, 185a, etc. (shafts 185z, 185y, 185x, etc.). Then the fiber passes out between the belts as at 190. Heated air is blown into the chamber J through a blast box 200 provided with a blower 201.

Preferably, air is drawn into the pipe 202 and is circulated in contact with a centrally-arranged hot air pipe 203 which may eventually carry the exhaust from an internal combustion engine driving the apparatus. The air thus heated is passed up through a conduit 200 to the blower 201. 205 is a regulator for regulating the flow of hot air to the blower.

Drive

Suitable mechanism for driving the apparatus is shown in Figure 19.

This mechanism includes an internal combustion engine 210 driving a main drive shaft 211 through a speed reducer 212 and clutch 215.

The shaft 211 drives a pump 220 which takes water from the tank 221 and feeds it through suitable piping to the water outlets previously described, for example 112, 123, 145, 173, etc. A pulley 223 and belt 224 connect the shaft 211 with a suitable pulley on the pump.

The blower 201 is connected with the drive shaft 211 through a pulley 225, belt 226 and a pulley 227.

On the end of the shaft 211 is a bevelled gear 230 which meshes with a pinion 231 on a shaft 232 which also carries a pulley 233. A belt 235 is driven from the pulley 233 and drives a pulley 236 on the shaft 116v.

On the shaft 116v is mounted the roller 116d which drives the belt 110.

Belts, chains, sprockets and gears drive the remainder of the apparatus as will be clear by comparing Figure 19 with Figure 1.

For example, the shaft 162a mounts the roller 162 which drives the belt 161. The roller 172a mounts the roller 172 which drives the brush unit M. The shaft 143a mounts one of the rollers 143 which drives the brush unit J. The rollers 122y and 122z mount the rollers 122 and 122a respectively which drive the scraping unit H. The shaft 105a mounts the picking mechanism 105 of the unit G and the shaft 91a mounts the cutting mechanism of the unit G.

The shafts 80a, 82a, and 81a mount the rollers 80, 82 and 81 of the bending unit F.

The shafts 70z, 70y and 70x, 75z, 75y and 75x mount the rollers 70, 70a, and 70b and 75, 75a and 75b respectively of the unit E.

In the unit D, the following shafts and rollers correspond.

| | |
|---|---|
| Shaft 47a | Roller 47. |
| Shaft 38a | Roller 38b. |
| Shaft 66 | Roller 65. |

In the unit C, the following shafts correspond to the rollers as follows.

| | |
|---|---|
| Shaft 38c | Roller 38. |
| Shaft 36a | Roller 36. |
| Shaft 35a | Roller 35. |

In the unit B, the shaft 28a mounts the eccentric roller 28.

It will be easily seen by reference to the drawings particularly comparing Figure 19 and Figure 2, how the drive from the internal combustion engine 210 is transmitted to the various parts of the unit.

Summary of steps

As will be seen from study of the treatment steps which have been described, the plant is subjected to the following operations.

1. A number of stalks are separated from the mass and automatically laid parallel, separated, and advanced continuously for individual treatment. Unit B.

2. Each stalk is engaged first by pronged conveying means which includes spikes which positively engage the stalk. Unit C.

3. Each stalk is then pressed into a feeding channel and urged against a rotary blade which cuts the stalk in two down the middle. Unit D.

4. The halves of the cut stalks are carefully separated and laid flat, bark upwards and wood downwards. Unit E.

5. Each half is then flattened and bent around a curvature to loosen the bark from the wood. Unit F.

6. Each half is then subjected to a cutting operation in which cutters cut through the wood without cutting the bark. This divides the wood into short lengths or chips. Unit G.

7. The short lengths of wood are then picked, for example, scutched, from the bark. Unit G.

8. The bark is then scraped to remove from the bark plastic material, i. e. the pectin matter and gums on the top and between the fibers. This is done in the presence of a continuous flow of water. At this point the fibers become separated from one another and degummed. Unit H.

9. The resulting fiber is then brushed in the presence of water to remove remaining gums and foreign matter. Unit J.

10. The gums, pectin matter and waste fibers which also become dislodged from the main fiber mass in these last two steps are collected together. Unit K.

11. The fiber is subjected to a softening and still further degumming process by brushing with a chemical solution, for example made up of a weak aqueous solution of heated caustic soda. Unit I.

12. The fiber is then washed by brushing in the presence of water to remove the caustic soda and chemical solution. Unit M.

13. The fiber is then dried. Unit N.

14. The fiber is expelled at 190 in the form of a thin layer of parallel dry fibers.

Thus, the process is characterized by progressive separation of the components of the bast fiber plant and their separation by degrees with no attempt to produce an immediate separation in one or two steps. The process is continuous and results in the material entering as a plant and the fiber of the plant emerging in continuous fleeces.

Integrated process

The invention also contemplates an integrated process of utilizing the extracted components of the bast fiber plant. A flow sheet of this process is shown in Figure 19.

The steps are as follows. The fiber taken from the outlet of the machine as at 190 is one of the components. The wood conveyed out of the apparatus by the conveyor 105 is another component. The plastic materials i. e. pectins and gums binding the fibers in the outer bark constitute a further component.

A preferred manner of integrated use of these components is as follows. The wood from the conveyor 105 is further subdivided into small fiber-like chips. These chips are then passed into the conveyor-mixer 130 where they encounter and are mixed with the pectin, gums, water and waste fiber from the plant which has reached the conveyor 131 as previously described. To this mixture may be added binder materials, for example resins.

The mixture is fed to a board press. The pressing may be hot or cold. The pressure may vary depending on the particular type of board, hard board, soft board, etc.

The fiber extracted from the bark, as previously described, is taken to a converting process. This may be spinning or it may be the manufacture of non-woven fabric. In either case binder-material, for example resin, may be added to the fiber.

I claim:

1. A method of treating a bast fiber plant which comprises aligning the stalks in substantially parallel relationship and separating them for individual treatment, subjecting each stalk of a plurality simultaneously to the following steps, positively feeding the stalk by impaling impulsion, advancing the stalk while supporting it over a substantial portion of its length and then while so supporting it, splitting it lengthwise and laying the split halves side by side, bark upwards, bending the halves about a curvature to loosen the bark, then retaining the halves on a surface while cutting the wood transversely without cutting the bark, the cutting being done at spaced-apart intervals so as to divide the wood, picking the cut pieces of wood from the bark, scraping the bark to remove the plastic matter on top of and between the fibers, brushing the scraped fiber in the presence of water to further remove plastic and foreign matter and loose fibers, and further degumming the fiber by brushing it with a chemical solution, further brushing the fiber in the presence of water to remove chemical and drying the fiber.

2. A method of treating a bast fiber plant which comprises aligning the stalks in substantially parallel relationship and separating them for individual treatment, subjecting each stalk of a plurality simultaneously to the following steps, positively feeding the stalk by impaling impulsion, advancing the stalk while supporting it over a substantial portion of its length and then while so supporting it, splitting it lengthwise and laying the split halves side by side, bark upwards, bending the halves about a curvature to loosen the bark, then retaining the halves on a surface while cutting the wood transversely without cutting the bark, the cutting being done at spaced-apart intervals so as to divide the wood, and picking the cut pieces of wood from the bark.

3. A method of treating a bast fiber plant which comprises aligning the stalks in substantially parallel relationship and separating them for individual treatment, subjecting each stalk of a plurality simultaneously to the following steps, positively feeding the stalk by impaling impulsion, advancing the stalk while supporting it over a substantial portion of its length and then while so supporting it, splitting it lengthwise and laying the split halves side by side, bending the halves about a curvature to loosen the bark, then retaining the halves on a surface while cutting the wood transversely without cutting the bark, the cutting being done at spaced-apart intervals so as to divide the wood, picking the cut pieces of wood from the bark, scraping the bark to remove the plastic matter on top of and between the fibers, brushing the scraped fiber in the presence of water to further remove plastic and foreign matter and loose fibers, and further degumming the fiber by brushing it with a chemical solution, further brushing the fiber in the presence of water to remove chemical and drying the fiber.

4. A method of treating a bast fiber plant which comprises aligning the stalks in substantially parallel relationship and separating them for individual treatment, subjecting each stalk of a plurality simultaneously to the following steps, positively feeding the stalk by impaling impulsion, advancing the stalk while supporting it over a substantial portion of its length and then while so supporting it, splitting it lengthwise and laying the split halves side by side, bending the halves about a curvature to loosen the bark, then retaining the halves on a surface while cutting the wood transversely without cutting the bark, the cutting being done at spaced-apart intervals so as to divide the wood, and picking the cut pieces of wood from the bark.

5. A method of treating a bast fiber plant, comprising splitting its stalks lengthwise and laying the split halves side by side, bending the halves about a curvature to loosen the bark, then retaining the halves on a surface while cutting the wood transversely without cutting the bark, the cutting being done at spaced-apart intervals so as to divide the wood into chips and picking the chips from the bark.

6. A method of treating a bast fiber plant which comprises aligning the stalks in substantially parallel relationship and separating them for individual treatment, subjecting each stalk of a plurality simultaneously to the following steps, positively feeding the stalk, advancing the stalk while supporting it over a substantial portion of its length and then while so supporting it, splitting it lengthwise and laying the split halves side by side, bending the halves about a curvature to loosen the bark, then retaining the halves on a surface while cutting the wood transversely without cutting the bark, the cutting being done at spaced-apart intervals so as to divide the wood, picking the cut pieces of wood from the bark, scraping the bark thus removed from the wood and scrubbing in the presence of liquid to remove plastic and foreign matter and loose fibers.

References Cited in the file of this patent

UNITED STATES PATENTS

| Number | Name | Date |
|---|---|---|
| 635,345 | Packer | Oct. 24, 1899 |
| 722,556 | Belding | Mar. 10, 1903 |
| 910,406 | Montgomery | Jan. 19, 1909 |
| 1,089,261 | Pos | Mar. 3, 1914 |
| 1,095,921 | Parks | May 5, 1914 |
| 1,233,529 | Wessel | July 17, 1917 |
| 1,797,763 | Einstein | Mar. 24, 1931 |
| 1,802,968 | Everett et al. | Apr. 28, 1931 |
| 1,812,654 | Kirschbraun | June 30, 1931 |
| 2,305,904 | Selvig | Dec. 22, 1942 |